United States Patent [19]
Hisatake et al.

[11] Patent Number: 5,774,356
[45] Date of Patent: Jun. 30, 1998

[54] IMAGE FORMING APPARATUS WITH JOB PRIORITY MANAGEMENT OF OUTPUT PROCESSING

[75] Inventors: Masayuki Hisatake; Yoshihiko Nemoto, both of Kanagawa, Japan

[73] Assignee: Fuji Xerox Co., Ltd., Tokyo, Japan

[21] Appl. No.: 449,100

[22] Filed: May 24, 1995

[30] Foreign Application Priority Data

May 25, 1994 [JP] Japan .................................. 6-111106

[51] Int. Cl.⁶ .................................................. G05B 13/02
[52] U.S. Cl. ........................ 364/148; 364/152; 358/403; 358/401; 101/113
[58] Field of Search ...................... 364/148, 149, 364/132–134, 468.06; 358/401, 402, 403, 208, 496, 448; 395/673, 22, 101; 399/19, 367

[56] References Cited

U.S. PATENT DOCUMENTS

| | | | |
|---|---|---|---|
| 4,947,345 | 8/1990 | Paradise et al. | 364/519 |
| 5,010,514 | 4/1991 | Kippenham et al. | 364/900 |
| 5,245,368 | 9/1993 | Farrell et al. | 358/401 |
| 5,377,016 | 12/1994 | Kashiwagi et al. | 358/403 |
| 5,511,150 | 4/1996 | Beaudet et al. | 395/113 |

FOREIGN PATENT DOCUMENTS

| | | |
|---|---|---|
| 2-113327 | 4/1990 | Japan . |
| 2-225067 | 9/1990 | Japan . |
| 4-233028 | 8/1992 | Japan . |
| 4-256013 | 9/1992 | Japan . |
| 5-130311 | 5/1993 | Japan . |
| 5-136934 | 6/1993 | Japan . |

*Primary Examiner*—Reba I. Elmore
*Assistant Examiner*—Sheela S. Rao
*Attorney, Agent, or Firm*—Finnegan, Henderson, Farabow, Garrett & Dunner, L.L.P.

[57] ABSTRACT

Image data is input through an image data input means, and stored into an image data storage means on a job basis. The volumes of the respective stored jobs are recognized by a job volume recognition means. A processing priority determination means determines an output processing priority order of the stored jobs based on the recognized job volumes. An interrupt can be generated for a priority job even during output processing of another job according to the output processing priority order.

14 Claims, 15 Drawing Sheets

FIG.2(a)

| SPOOL FILE | JOB VOLUME DATA | JOB PROCESSING PRIORITY |
|---|---|---|
| B | 30KB | 1 |
| C | 200KB | 2 |
| D | 2MB | 3 |
| ⋮ | ⋮ | ⋮ |

FIG.2(b)

| SPOOL FILE | JOB VOLUME DATA | PRINT PROCESSING PRIORITY |
|---|---|---|
| A | 3KB | 1 |
| B | 27KB | 2 |
| C | 197KB | 3 |
| D | 1.9MB | 4 |
| ⋮ | ⋮ | ⋮ |

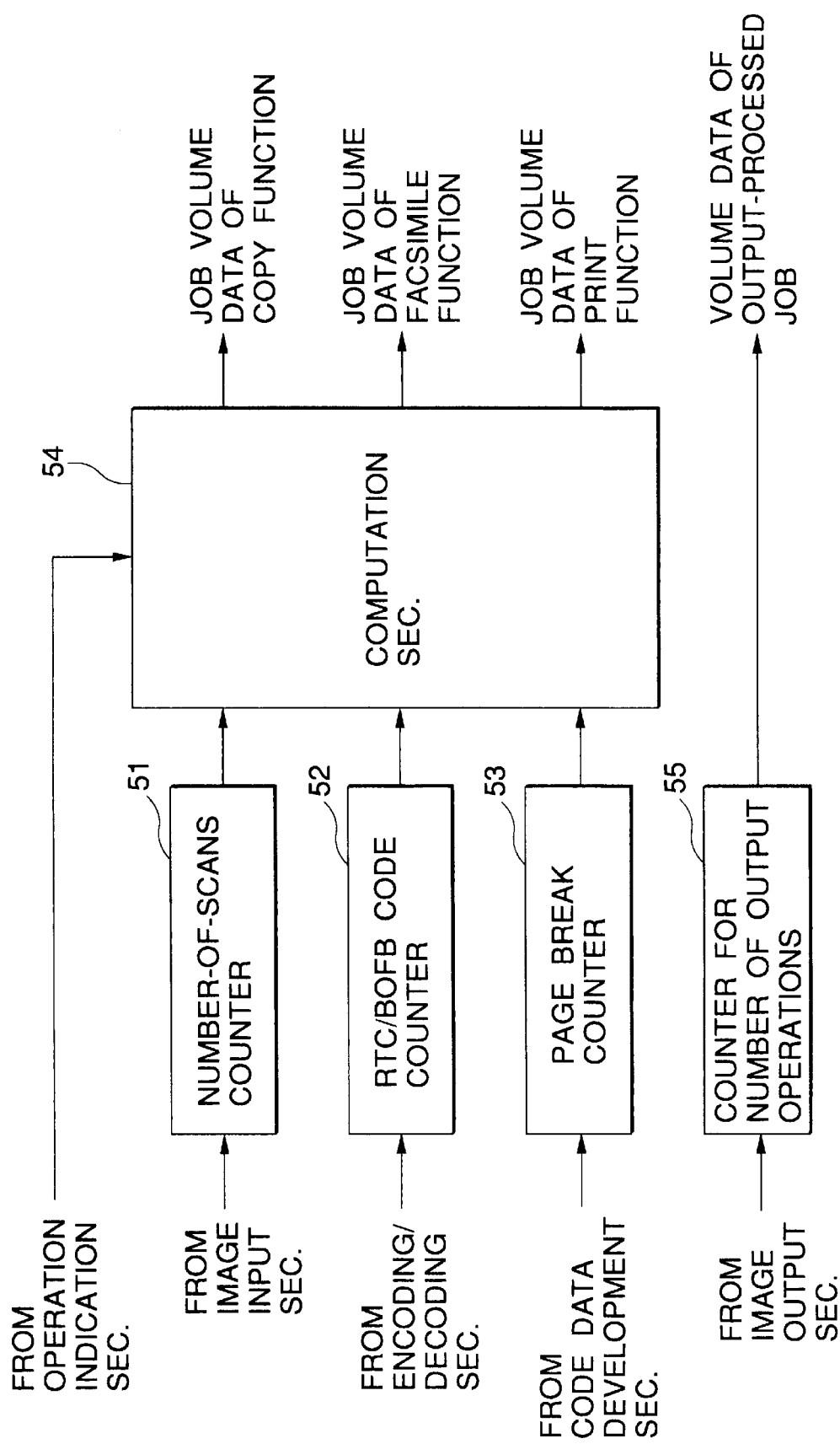

FIG.9(a)

| RECEIPT NO. | FUNCTION | JOB VOLUME | OUTPUT PROCESSING PRIORITY | NUMBER OF INTERRUPTS |
|---|---|---|---|---|
| 1 | FACSIMILE | 5 | 1 | 0 |
| 2 | COPY | 30 | 2 | 0 |
| 3 | PRINT | 50 | 3 | 0 |
| 4 | PRINT | 1000 | 4 | 0 |

FIG.9(b)

| RECEIPT NO. | FUNCTION | JOB VOLUME | OUTPUT PROCESSING PRIORITY | NUMBER OF INTERRUPTS |
|---|---|---|---|---|
| 1 | FACSIMILE | 5 | 1 | 0 |
| 2 | COPY | 30 | 3* | 1 |
| 3 | PRINT | 50 | 4* | 1 |
| 4 | PRINT | 1000 | 5* | 1 |
| 5 | COPY | 10 | 2 | 0 |

FIG.11(a)

| RECEIPT NO. | FUNCTION | JOB VOLUME | OUTPUT PROCESSING PRIORITY | NUMBER OF INTERRUPTS |
|---|---|---|---|---|
| 1 | PRINT | 200 | 6 | 5 |
| 2 | COPY | 5 | 2 | 1 |
| 3 | FACSIMILE | 1 | 1 | 0 |
| 4 | COPY | 50 | 4 | 1 |
| 5 | COPY | 20 | 3 | 0 |
| 6 | PRINT | 100 | 5 | 0 |

FIG.11(b)

| RECEIPT NO. | FUNCTION | WEIGHT $\alpha$ | JOB VOLUME $J$ | $\alpha \times J$ | OUTPUT PROCESSING PRIORITY | NUMBER OF INTERRUPTS |
|---|---|---|---|---|---|---|
| 1 | PRINT | 0.1 | 200 | 20 | 4 | 3 |
| 2 | COPY | 1 | 5 | 5 | 2 | 1 |
| 3 | FACSIMILE | 1 | 1 | 1 | 1 | 0 |
| 4 | COPY | 1 | 50 | 50 | 6 | 2 |
| 5 | COPY | 1 | 20 | 20 | 5 | 0 |
| 6 | PRINT | 0.1 | 100 | 10 | 3 | 0 |

| JOB VOLUME | WEIGHT OF COPY FUNCTION $\alpha_C$ | WEIGHT OF FACSIMILE FUNCTION $\alpha_F$ | WEIGHT OF PRINT FUNCTION $\alpha_P$ |
|---|---|---|---|
| 1 ~ 19 | 1 | 1 | 1 |
| 20 ~ 49 | 0.9 | 1 | 1 |
| 50 ~ 59 | 0.8 | 0.02 | 1 |
| 60 ~ 99 | 0.8 | 1 | 1 |
| 100 ~ 199 | 0.8 | 1 | 0.1 |
| 200 ~ 249 | 0.7 | 1 | 0.1 |
| 250 ~ 499 | 0.7 | 1 | 0.1 |
| 500 ~ | 0.7 | 1 | 0.1 |

IMAGE FORMING APPARATUS WITH JOB PRIORITY MANAGEMENT OF OUTPUT PROCESSING

FIELD OF THE INVENTION

This invention relates to an image forming apparatus which can perform processing, particularly output processing, on image data in connection with a plurality of functions such as a copying function, a facsimile function, and a print function.

DESCRIPTION OF THE PRIOR ART

Conventionally, in a digital copier capable of independently executing a plurality of functions such as a copying function, a facsimile function, and a print function, various proposals have already been put forward for the order in which to carry out image data obtained as a result of these functions.

For example, Unexamined Japanese Patent Publication No. Hei. 5-130311 discloses the processing of each function in accordance with a predetermined priority order.

Unexamined Japanese Patent Publication No. Hei. 5-136934 discloses the determination of processing of functions which are in conflict one another under conditions specified by a user.

Moreover, as regards the print function, various proposals are put forward as to the order in which to execute output processing.

Unexamined Japanese Patent Publication No. Hei. 4-256013 discloses a method of execution of output processing comprising the steps of dividing a job into a plurality of spool files; initiating output processing on a divided spool file unit basis; and initiating the processing of the next job after the completion of the output processing of the current job.

Unexamined Japanese Patent Publication No. Hei. 2-225067 discloses an apparatus provided with a means for switching a priority of output processing, and the apparatus executes output processing by switching output processing data interface means.

Unexamined Japanese Patent Publication No. Hei. 4-233028 discloses a printer which assigns data stored in s spool means a predetermined priority and executes output processing of the data in accordance with the priority order.

Unexamined Japanese Patent Publication No. Hei. 2-113327 discloses an apparatus provided with means for selecting interface means, and data from an interface means which an interrupt means specified using the selection means are preferentially processed.

The above prior art techniques encounter the following problems.

The technique disclosed in Unexamined Japanese Patent Publication No. Hei. 5-130311 makes it possible to share an image I/O section of a digital copier among functions. However, if jobs having a higher priority are concentrated on a function having a higher priority, a function job having a lower priority remain unprocessed until the processing of the function jobs having a higher priority are completed. If operating conditions of a user are not matched with a priority order, a function job which a user wants to assign priority will remain unprocessed because the priority order is fixed.

The technique disclosed in Unexamined Japanese Patent Publication No. Hei. 5-136934 makes it possible for a user to specify the order of processing of functions of a digital copier. However, if jobs, each having, for example, a large number of outputs, are concentrated on a function having a higher priority, the processing of a function job having a lower priority will be delayed, even if that job has a small number of outputs.

The technique disclosed in Unexamined Japanese Patent Publication No. Hei. 4-256013 makes it possible to concurrently execute spooling and output processing by the division of a job into a plurality of spool files. Once output processing is started, it is impossible to execute output processing of another job until the processing of the current job is completed. For example, once output processing of a job which is as large as 1,000 sheets, is started, another job which may be as small as one sheet is left until the former job is completed.

The technique disclosed in Unexamined Japanese Patent Publication No. Hei. 2-225067 permits priority processing. However, since a priority is set for each interface means, the output processing of another job cannot be executed until the output processing of a plurality of jobs is completed, in the same manner as in the previously mentioned example, when the plurality of jobs are received by the same interface means.

According to the technique disclosed in Unexamined Japanese Patent Publication No. Hei. 4-233028, only the output processing of a plurality of jobs having a higher priority is executed because of the lack of means for changing a priority of data stored in a spool means, and the output processing of another job having a lower priority, which was stored in the spool means before the plurality of jobs, remains unstarted.

The technique disclosed in Unexamined Japanese Patent Publication No. Hei. 2-113327 permits selection and changing of interface means. However, if the same interface means receives a plurality of jobs, a similar problem will naturally arise that the output processing of another job cannot be executed until the output processing of the current job is completed. Moreover, it is necessary for a user to select or change the user interface means, and hence a laborious operation is required.

SUMMARY OF THE INVENTION

The present invention has been made to solve the drawbacks in the prior art, and an object of this invention is to provide an image forming apparatus, such as a digital copier or a printer, capable of processing jobs such that the waiting time of a job having a small volume of processing is suppressed to a minimum necessary level even while a job of early arrival having a large volume is being processed.

According to the invention, there is provided an image forming apparatus comprising:

image data input means for inputting image data;

image data storage means for storing the input image data in units of a job that requires image formation;

job volume recognition means for recognizing volumes of the respective jobs stored in the image data storage means; and processing priority determination means for determining a processing priority order of the jobs stored in the image data storage means based on the job volumes recognized by the job volume recognition means.

The image data input means may have a plurality of interfaces for receiving print data from respective external devices.

The job volume recognition means may recognize the job volumes by estimating processing times of the respective jobs based on the image data stored in the image data storage means.

The processing priority determination means may set new volumes for jobs whose processing priorities have been changed, based on a volume of a new job recognized by the job volume recognition means, and determine the processing priority order based on the new job volumes.

The image forming apparatus may further comprise function data recognition means for recognizing function data of the respective jobs of the input image data, wherein the processing priority determination means determines the processing priority order further based on the function data.

The image forming apparatus may further comprise output processing means for performing output processing in accordance with the processing priority order, and interrupt control means for generating an interrupt for a priority job to a job being subjected to the output processing by the output processing means.

The image forming apparatus may further comprise job volume measuring means for measuring a volume of an output-processed portion of the job being subjected to the output processing, wherein the interrupt control means determines whether to generate the interrupt for the priority job based on the measured volume of the output-processed portion.

The image forming apparatus may further comprise unprocessed job volume measuring means for measuring a volume of an unprocessed portion of the job being subjected to the output processing, wherein the interrupt control means determines whether to generate the interrupt of the priority job based on the measured volume of the unprocessed portion.

The image forming apparatus may further comprise a sorting device for sorting output recording sheets of the priority job for which the interrupt control means generated the interrupt from output recording sheets of the interrupted job.

The priority job for which the interrupt control means generates the interrupt may be selected based on a volume of the priority job.

The image forming apparatus may further comprising an unprocessed job volume measuring means for measuring a volume of an unprocessed portion of the job being subjected to the output processing, wherein the priority job for which the interrupt control means generates the interrupt is selected by comparing a volume of the priority job and the measured volume of the unprocessed portion of the job being subjected to the output processing.

The image forming apparatus may further comprise function data recognition means for recognizing function data of the jobs of the input image data, wherein the priority job for which the interrupt control means generates the interrupt is determined based on the function data of the jobs recognized by the function data recognition means.

BRIEF DESCRIPTION OF THE DRAWINGS

FIGS. 2(a) and 2(b) are charts illustrating print processing priority tables;

FIG. 8 is schematic diagram showing the configuration of a job volume measuring section;

FIGS. 9(a) and 9(b) are charts showing job management tables;

FIGS. 11(a) and 11(b) are charts illustrating a method for determining an output processing priority order by taking into account function data;

DESCRIPTION OF THE PREFERRED EMBODIMENTS

The present invention will be hereinafter described by way of embodiments.

Figure 1:
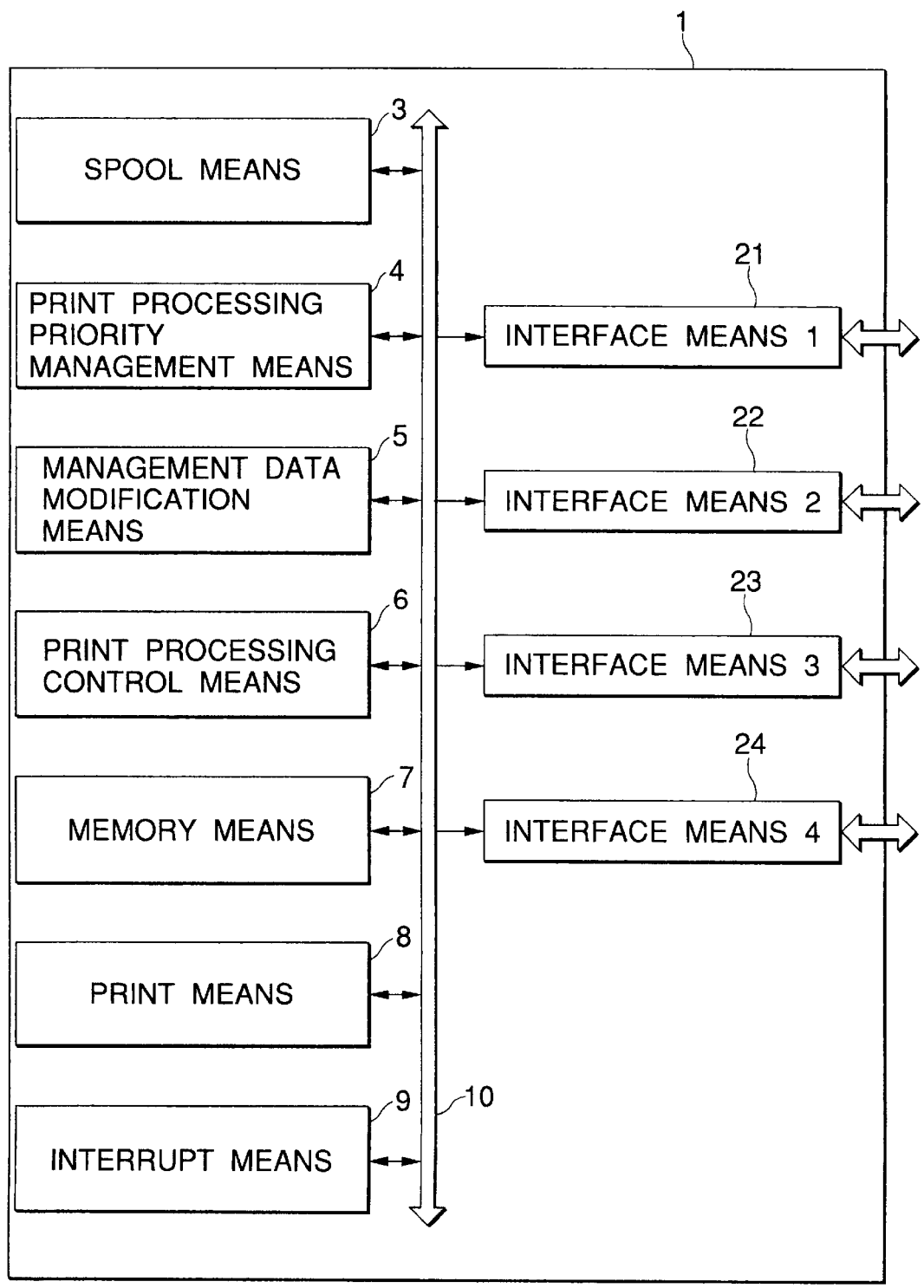
FIG. 1 is a block diagram of an image forming apparatus in one embodiment of the present invention.

FIG. 1 is a block diagram showing a printer 1 in one embodiment of the invention. The printer is made up of interface means 21 to 24; a spool means 3; a print processing priority management means 4; a management data modification means 5; a print processing control means 6; a memory means 7; a print means 8; an interrupt means 9; and a system bus 10. The operation of each of these components will be explained hereunder.

The interface means 21 to 24 receive print data from external devices, such as a connected host computer or a host computer connected to a network, in accordance with an instruction from the print processing control means 6.

The spool means 3 temporarily stores the print data received by the interface means 21 to 24 in accordance with an instruction from the print processing control means 6 in job blocks divided by the print processing priority management means 4.

The print processing priority management means 4 stores the volume of spool files, stored in the spool means 3, as data relating to the volume of jobs in blocks of print jobs. Simultaneously, the print processing priority means 4 also determines and stores a print processing priority according to the volume of a job. For example, as shown in FIG. 2(a), stored spool files, the volume of data of that spool file, and a print processing priority of the same are stored in the form of a print processing priority table as shown in FIG. 2(a). In the case of the print processing priority shown in FIG. 2(a), the volume of data of a spool file B is 30 KB; the volume of data of a spool file C being 200 KB; and the volume of data of a spool file D being 2 MB. A print processing priority of these spool files is in the order of B, C and D. At this time, if another spool file A is additionally stored, the volume of this new job and the volume of the previously stored jobs will be compared with each other, and the print processing priority of the jobs will be changed based on the result of the comparison. In this embodiment, as shown in FIG. 2(b), the volume of data of the spool file A is 3 KB, and hence this spool file has the highest print processing priority.

The management data modification means 5 modifies data of the print processing priority table which is managed by the print processing priority management means when the print processing priority is changed. For example, the data of the volume of the jobs relating to the spool files B, C, and D are reduced by the volume of the spool file A as shown in FIG. 2(b) so as to prevent a job from keeping waiting for the initiation of print processing as a result of a decrease of priority. If a predetermined condition occurs as a result of such a modification, the modification of a print processing priority on a job basis is inhibited.

The print processing control means 6 effects overall control to execute print processing in accordance with a print processing priority.

The memory means 7 stores image data, which the print means 8 records and outputs, in accordance with the print processing control means 6.

The print means 8 prints image data of the memory means 7, which has been developed into image data, on record paper in accordance with the print processing control means 6.

The interrupt means 9 generates an interrupt to the print processing control means 6 when a print processing priority of a job in a print wait state becomes higher than that of a job being subjected to print processing as a result of modification of the print processing priority by the print processing priority management means 4, and eventually the job in the wait state has the highest priority.

Figure 3:
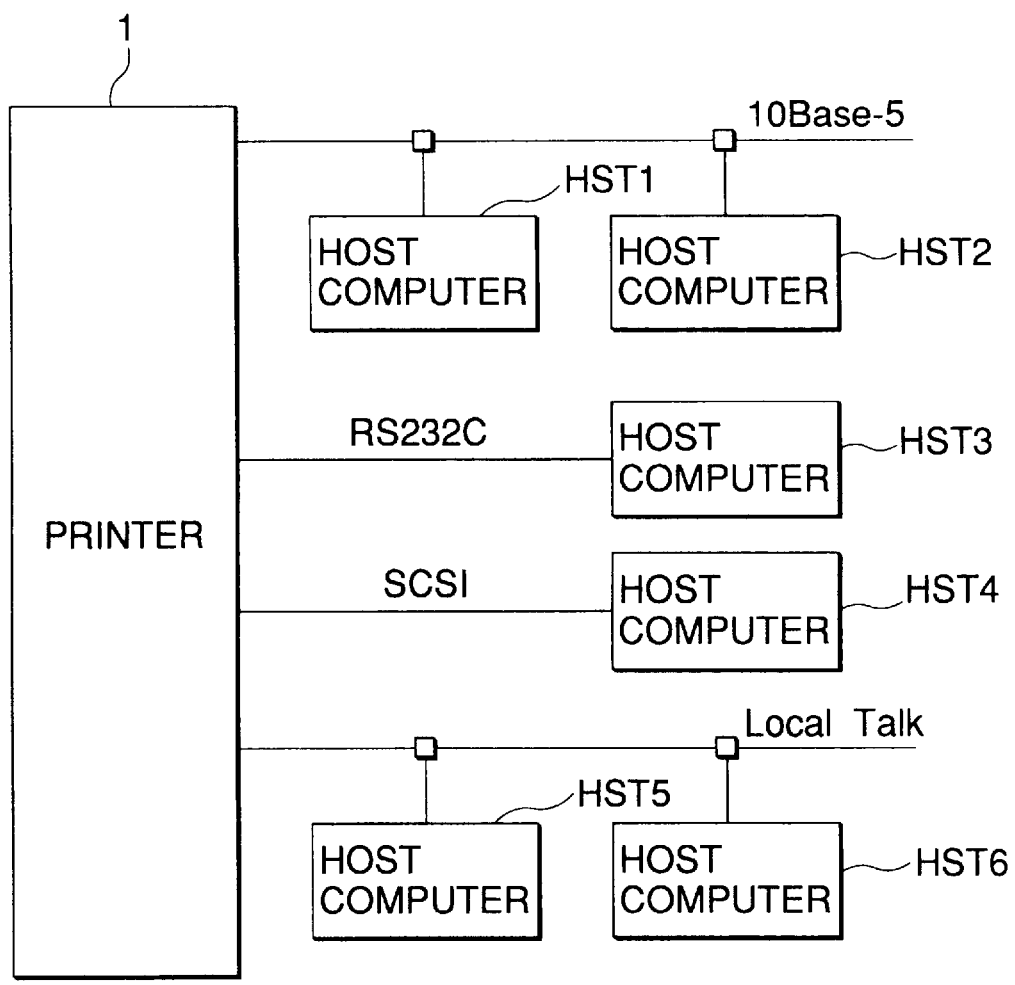
FIG. 3 is a schematic diagram showing a connection between interface means and external devices.

FIG. 3 shows how the printer of this embodiment is connected to external devices.

The printer 1 is connected to external devices via an interface means. To establish such a connection, there are several types of connections; namely, a network connection, such as Ethernet, here labelled the HST1, HST2, HST5, and HST6, a connection to a personal computer (HST3) using RS232C, and a connection to a personal computer (HST4) using a SCSI.

Figure 4:
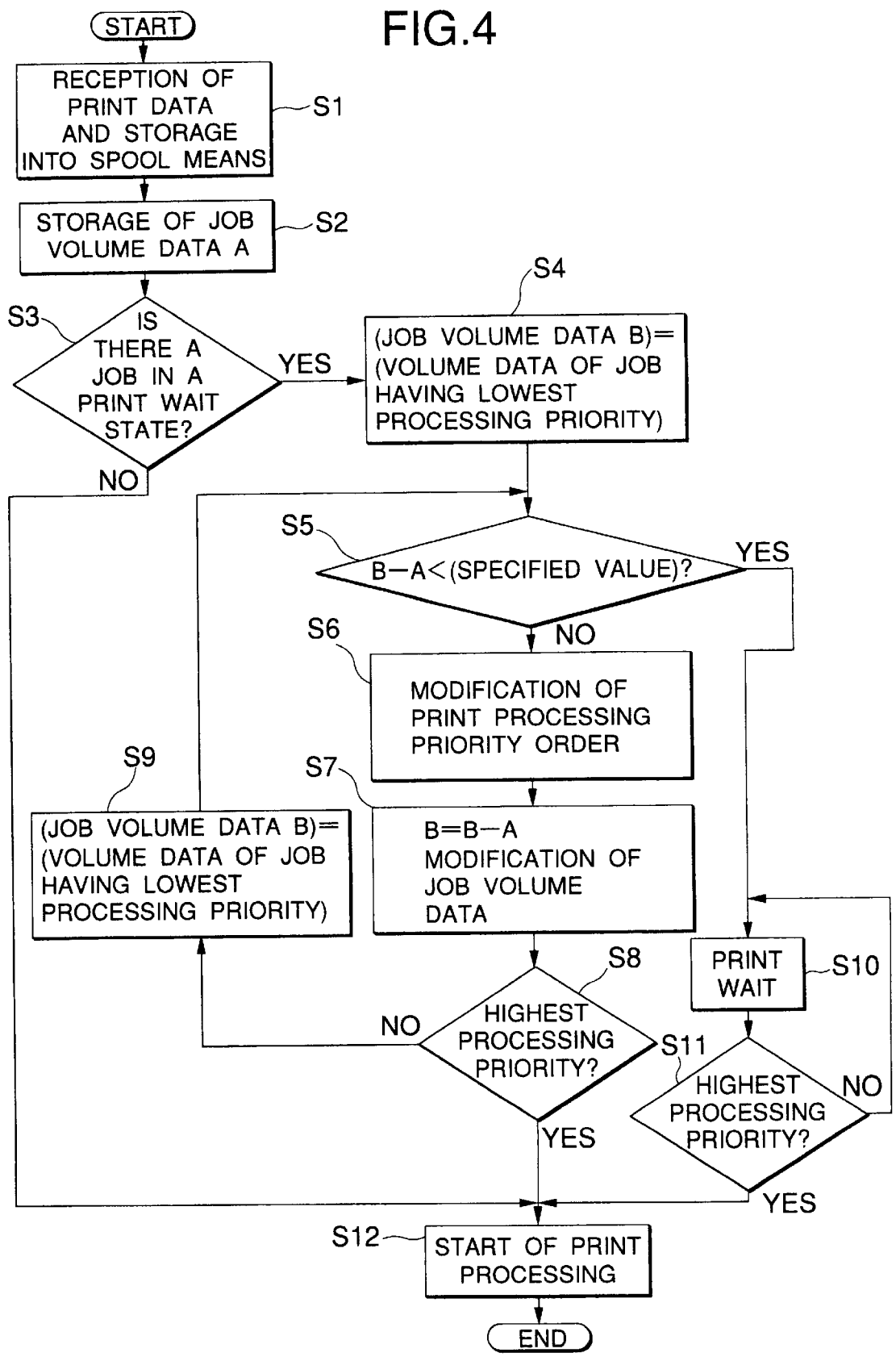
FIG. 4 is a flowchart showing the operation of the image processing apparatus in one embodiment of the present invention.

FIG. 4 is a flowchart for illustrating the operation of the printer in this embodiment of the present invention. With reference to FIG. 4, the modification of a print processing priority order of the printer will now be described. When print data are received through the interface means 21 to 24, the print data are temporarily stored in job blocks (step S1). At this time, the volume of a spool file is stored as job volume data A in the print processing priority management means 4 (step S2). The print processing priority management means 4 refers to a print processing priority table as shown in FIGS. 2(a) and 2(b), and determines whether or not any job is in a wait state (step S3). If no job is in the wait state, print processing will be initiated (step S12). However, if a job is in a wait state, job volume data B of a job having the lowest print processing priority will be read out (step S4). A difference between job volume data B and job volume data A is obtained, and the difference is compared with a specified value (step S5). The specified value is a parameter for taking into account a spooled priority and set, for example, as a predetermined volume of a job. If a comparison result is smaller than the specified value, the print processing priority order is not modified, and the job is assigned the lowest processing priority and enters a print wait state (step S10). The job in the print wait state waits until the print processing of another job having a higher processing priority is finished (step S11). After the processing of the job having a higher priority has been finished, the print processing of the job having the lowest processing priority is started (step S12). If the comparison result is larger than the specified value, the print processing priority order will be modified (step S6). At this time, a difference between the volume of a job which has its print processing priority decreased as a result of the modification and the volume of a job which has its print processing priority increased as a result of the modification is calculated. The management data modification means 5 modifies the data of the volume of jobs under management of the print processing priority management means 4 so that the calculated value will be the volume of the job which has its print processing priority decreased as a result of the modification (step S7). As a result of the calculation of the difference by means of the modification, when the volume of data of the job which has its print processing priority decreased is smaller than the specified value, the management data modification means 5 will inhibit the print processing priority management means 4 from modifying the print processing priority of a corresponding job. This inhibition is intended to prevent a job from being kept in the print wait state by the decrease of the priority and to ensure the initiation of print processing. If the print processing priority has been modified, whether or not the priority is the highest processing priority will be determined (step S8). If the modified priority is not the highest processing priority, processing will be executed to determine whether or not further modification of the print processing priority is carried out. The volume of data of a job having the subsequent lower priority is taken as the volume of data of a job to be compared (step S9). If the print processing priority of the job being subjected to print processing is modified to have the highest processing priority as a result of the modification of the print processing priority, print processing will be started (step S12). At this time, the interrupt means 9 generates an interrupt to the print processing control means 6. At the time of the initiation of the print processing, it is possible to select any one from the following three methods; 1) a method for starting print processing after a job undergoing print processing has been completed; 2) a method for starting print processing by interrupting a job undergoing print processing after waiting for the completion of the page currently being processed in that job, upon receipt of an interrupt from the interrupt means 9; and 3) a method for starting print processing by immediately interrupting a job undergoing processing upon receipt of an interrupt from the interrupt means 9. The print means 8 carries out print processing of the job which has its priority changed in accordance with a selected method.

In this embodiment, a difference between the volume of data of jobs is calculated by means of the modification of print processing priority. As a result of this, when the volume of data of the job which has its print processing priority decreased is smaller than the specified value, the modification of a print processing priority of that job is inhibited. However, it is possible to inhibit the modification of a print processing priority of a job when interrupts are carried out a specified number of times, by managing the number of interrupts (the number of times priority is modified) resulting from the modification of print processing priority by the management data modification means 5.

Figure 5:
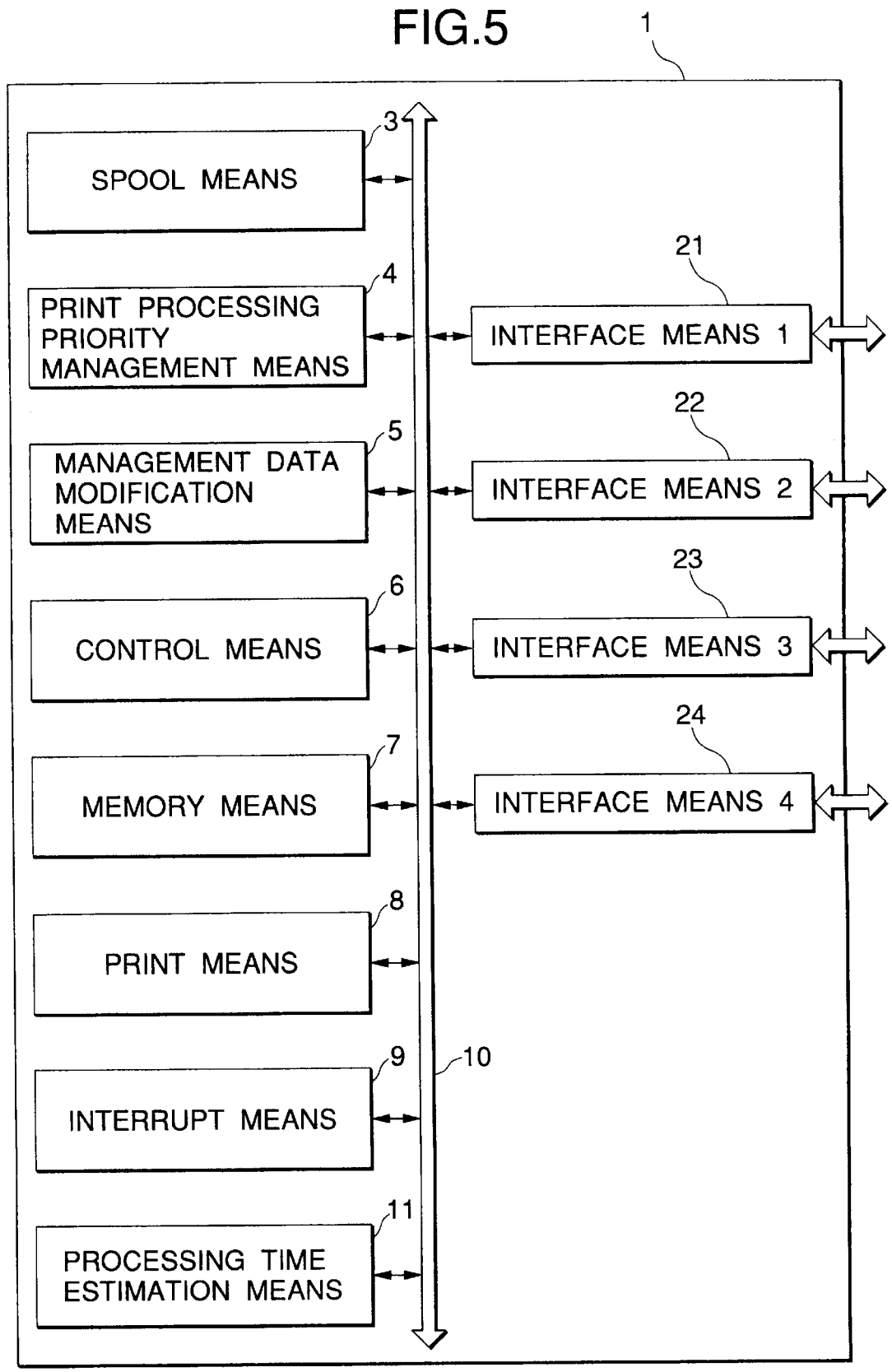
FIG. 5 is a block diagram of an image forming apparatus in another embodiment of the present invention.

FIG. 5 is a block diagram in connection with the printer 1 in another embodiment of the present invention.

The printer in this embodiment is made up of interfaces 21–24; a spool means 3; a print processing priority management means 4; a management data modification means 5; a print processing control means 6; a memory means 7; a print means 8; an interrupt means 9; a system bus 10; and a processing time estimation means 11. The operation of the print processing priority management means 4 and the processing time estimation means 11 will be described hereunder. The operation of the other constituent elements is the same as that of the elements in the previous embodiment.

The processing time estimation means 11 reads spool files, in job blocks, stored by means of the spool means 3, and also estimates time needed for development of the print data received through the interface means 21 to 24 to image data. The estimated time is communicated to the print processing priority management means 4.

The print processing management means 4 stores, in blocks of print jobs, estimated processing time data communicated from the processing time estimation means 11 with respect to the spool files stored by the spool means 3. When another spool file is newly stored, an estimated processing time data for that file and the estimated processing time data for the previously stored jobs are compared with each other, and the print processing priority order of the jobs is modified based on a comparison result.

The print processing priority determination operation of the printer in this embodiment is the same as that of the printer in the previous embodiment except that data used for determination are not the volume of spool files but estimated processing time of a job.

An explanation will be given of the image forming apparatus in another embodiment of the present invention which is embodied into an image forming apparatus having a plurality of functions, such as facsimile and copy functions, in addition to a printer function.

Figure 6:
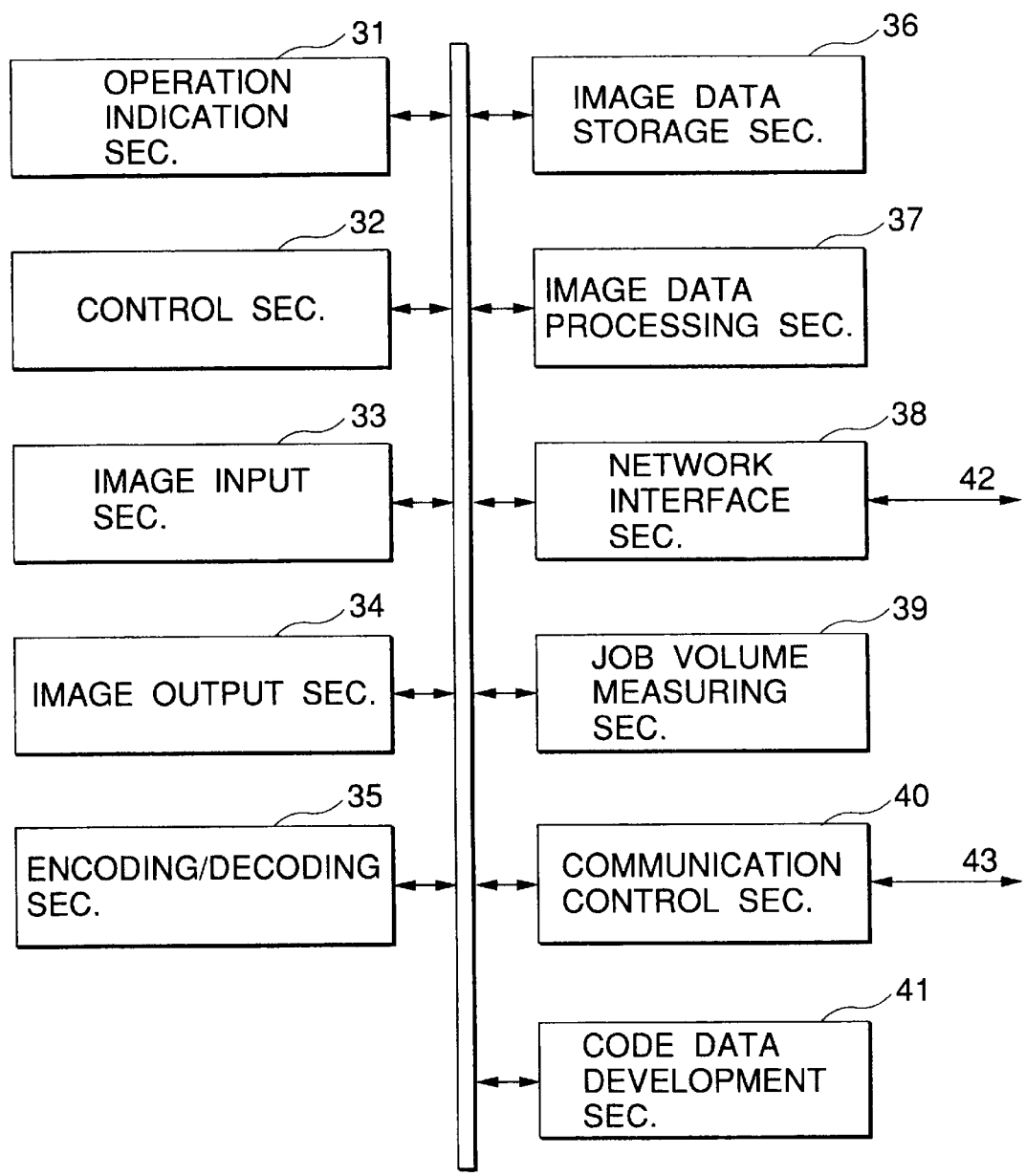
FIG. 6 is a block diagram of an image forming apparatus in still another embodiment of the present invention.

FIG. 6 is a block diagram showing the structure of the image forming apparatus in this embodiment.

An operation indication section 31 is made up of a display or a control panel. This operation indication section 31 is a block providing an instruction relating to each type of function, for example, settings relating to a copy function such as the number of copies and a scale factor for copy, or settings relating to a facsimile function such as a receiving party and a transmission mode, and also displaying an error message and an operation guide.

An image input section 33 exposes the original sheet placed on the top of a platen to light such as a fluorescent lamp, and reflected light is optically read by, for example, a CCD sensor. After having been subjected to offset and gain adjustments, the read signal is converted from analog image data into digital image data. This block may occasionally carry out so-called shading correction which corrects variations in sensitivity between each of the elements of the CCD sensor.

An image output section 34 is a so-called printer block employing a laser or an LED. In this block, a latent image is formed by selectively exposing a photoreceptor drum using a laser beam or an LED head. The latent image, which is materialized by a developing agent consisting of a toner and a carrier, is then transferred onto image record paper, and the transferred image is thermally fixed.

An encoding/decoding section 35 compresses image data into a predetermined encoding format (MH, MR, MMR) when the image data is transmitted by a facsimile machine or decodes data received through a telephone line 43 to the original image data.

A code data developing section 41 is used for developing print data, being received through a network line 42, and being described in PDL such as postscript, into bit map image data.

A network interface section 38 controls communication between the image forming apparatus and another work station or a host such as a personal printer via the network line and for receiving print data.

A communication control section 40 transmits code data, generated by the encoding/decoding section 35, to another facsimile machine or decoder via a telephone line, by modulating the code data using a modem, and converts a signal received from, for instance, another facsimile machine to digital code data by demodulating the received signal using a modem. This communication control section also controls connections of communication lines.

An image data storage section 36 temporarily stores digital image data read by the image input section 33, print data received by a network interface section 38, and facsimile data received by the communication control section 40. The image data storage section 36 is also used as a working memory when code data are developed to bit map image data by the code data developing section 41, or when image data are compressed to code data or code data are expanded to image data by the encoding/decoding section 35. As a matter of course, it is also possible to store data received by the network interface section 38 or the communication control section 40, and image data read by the image input section 33 into the image data storage section 36 in the form of file data. Although the image data storage section 36 is used as a temporary storage memory for image data in this embodiment, each memory may be individually provided for each block.

An image data processing section 37 is a block which carries out rotation processing to bring the orientation of image data into line with the direction of record paper usable in the image output section 34, modification of resolution of read image data so as to match with resolution of a recording section of a facsimile machine on the other end when image data read by the image input section 33 are transmitted by a facsimile machine, and smoothing processing to remove aliasing formed along a fine line portion of a bit map image generated by the code data developing section 41.

A job volume measuring section 39 is measures the volume of job in the image output section 34 commonly used by functions of the image forming apparatus such as a facsimile function, a print function, and a copy function. Throughout the following description, a job volume indicates the number of sheets of record paper on which the image output section 34 actually outputs image data. For example, if the image input section 33 reads ten sheets of A4-size originals, and if each of the originals is duplicated in five copies, a job volume will be 50. However, in the present invention, the definition of the job volume is not limited to this. For example, the job volume may be represented by a processing time in the image output section or the total amount of image data output from the image output section. The job volume may be related to the volume of processing in the image input section 33, for example, the time required to read an image and the amount of read image data, or may be related to the volume of processing in the image data storage section 36, for example, the time required to execute storage and the amount of stored data.

A control section 32 controls an operation mode and an operation timing of each block in accordance with each function. Particularly, as will be described later, the control section determines a processing priority of each job in the image output section 34 in accordance with a job volume measured by the job volume measuring section 39 in this embodiment. An operation timing of each block is controlled so that a job of each function will be sequentially output in the image output section in accordance with the priority.

Figure 7:
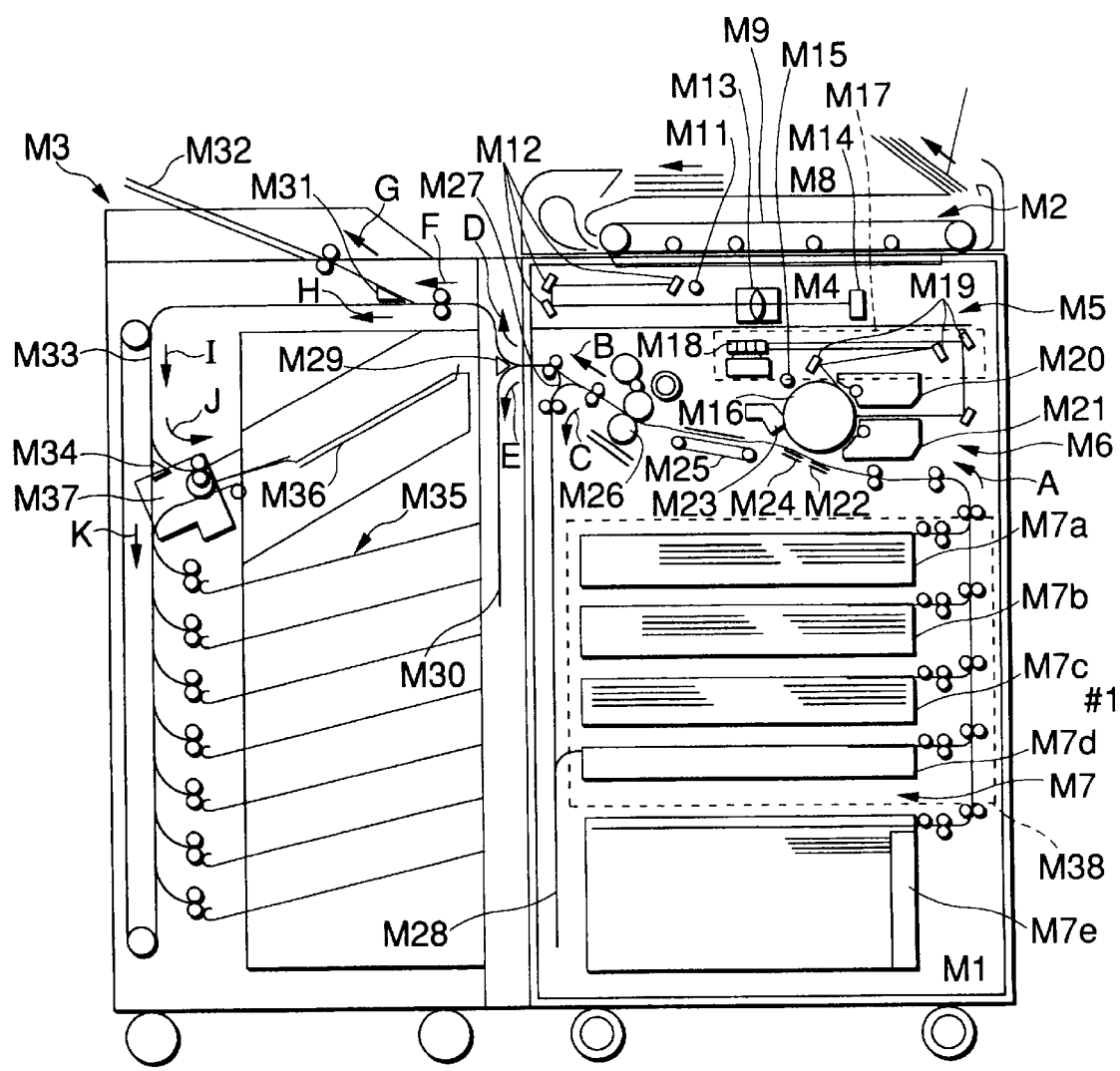
FIG. 7 is a cross-sectional view showing schematic construction of the image forming apparatus shown in FIG. 6.

FIG. 7 is a cross-sectional view showing the construction of the image forming apparatus according to the present invention. The entire image forming apparatus is roughly divided into three sections; namely, an image forming section M1 for producing a copy by forming a toner image, corresponding to an original image, on record paper; an automatic original feeding section M2 for automatically feeding an original with respect to an original receiving plane of the image forming section M1; and a post-treatment section M3 for carrying out post-treatment such as sorting and stapling of record paper discharged from the image forming section M1.

An image read section M5 for reading an original image by scanning an original positioned on a platen glass M4 which serves as the original receiving plane; a print section M6 for producing a toner image, corresponding to the original image, on record paper based on image data obtained by the image read section M5 or image data transmitted from a terminal unit in a LAN or through a public line; and a paper feed section M7 for supplying record paper to the print section M6, are housed, in this order from the top, within the image forming section M1.

The automatic original feed section M2 is provided so as to removably cover the platen glass M4 provided on the top of the image forming apparatus. Originals stacked on a tray M8 for originals are sequentially fed to the top of the platen glass M4 one by one by means of rollers (not shown) and a transfer belt M9, and the original image is read. The original is then discharged to a tray M10 for a discharged original by means of the transfer belt M9 and discharge rollers (not shown).

The image read section M5 is provided with an optical system consisting of an exposure lamp M11, a plurality of reflection mirrors M12, a lens M13, and an image sensor M14. The exposure lamp M11 and the reflection mirrors M12 are moved along the platen glass M4, and light reflected from the original is converged onto the image sensor M14. The light and shade of the original image are converted into an electrical image signal. The image signal is further converted into digital image data by an analog-to-digital converter circuit provided as an electric system within the image read section M5.

The print section M6 forms a toner image on record paper by utilization of the known electrophotography method, in accordance with the digital image data from the processing section. The surface of a photoreceptor drum M16 evenly charged by an electrostatic charger M15 is exposed to a laser beam emitted from a laser exposure unit M17, so that an electrostatic latent image is formed.

The laser exposure unit M17 is made up of a laser element (not shown) such as a semiconductor laser in which a drive current is modulated based on image data from the image read section M5, a polygon mirror M18 which periodically deflects a laser beam from the laser element in the direction orthogonal to the direction of the rotation of the surface of the photoreceptor drum M16, and a reflection mirror M19.

The latent image formed on the photoreceptor drum M16 is developed by a development unit M20 or M21, as a result of which a toner image is formed in a desired color on the surface of the photoreceptor drum M16. This toner image is transferred to record paper, which is fed from any one of a plurality of trays M7a to 7e of the paper feed section M7 along a path A, by means of a transfer section M22. The trays 7a to 7c are paper feed trays into which record paper having different sizes are contained; a tray M7d being an intermediate tray for temporarily containing record paper for double-sided copying purposes; and a tray M7e being a large-capacity tray for containing several hundred sheets of record paper. A cleaning section M23 removes a residual toner remaining on the surface of the photoreceptor drum M16 after the transfer of the toner image.

The record paper on which the toner image was transferred is removed from the photoreceptor drum M16 with the help of a removal section M24, and the thus removed record paper is transferred to a fixing section M26 by means of a conveyor M25. The record paper then undergoes a fixing treatment. The transfer path of the record paper after the fixing treatment is switched by a switching gate M27 between a path B connected to the post-treatment section M3 and a path C connected to the intermediate tray M7d via an inversion section M28 for double-sided copying purposes. In the case of a double-sided copy, the record paper is inverted, from front to back. by means of the inversion section M28, and the paper is again supplied to the print section M6 along the path A via the intermediate tray M7d. After a toner image has been formed on the back surface of the record paper, the record paper is fed to the post-treatment section M3.

The record paper discharged from the print section M6 to the post-treatment section M31 is switched to either a path D or a path E by means of a switching gate M29. The record paper advancing along the path D is fed to a path F while the image side of the record paper is directed facing upwards. On the other hand, the record paper advancing along the path E is fed to the path F while the record paper is inverted from the front side to the back side by the inversion section M30.

The record paper advancing along the path F is put into two paths by a switching gate M31; namely, a path G connected to a top tray M32, and a path H where the record paper will undergo various post-treatments. The record paper advancing along the path H is downwardly transferred along a path I by a vertical transfer belt M33, and it is then put into two paths; namely, a path J where the record paper will be subjected to a stapling treatment, and a path K along which the record paper will directly advance to a sorter bin M35. The record paper advancing along the path J is discharged into a hold tray M36, and the record paper sheets are stapled by a stapler M37 every time a required number of record paper is stacked. The stapled record paper is downwardly transferred again by the vertical transfer belt M33, and the record paper is discharged to a predetermined location within the sorter bin M35.

Turning back to FIG. 6, the operation of each block in each will now be explained.

(1) Copy Function

Image data are read from the image input section 33, and the thus read image data are temporarily sorted in the image data storage section M36. At this time, the image data may be stored after having been compressed into code data in the encoding/decoding section 35 in order to reduce the volume of the data. In parallel with this storage action, the code data temporarily stored into the image data storage section 36 are sequentially read out in accordance with conditions set by the operation display section 31. The thus read code data are expanded to image data by the encoding/decoding section 35, and they are output from the image output section 34. At this time, the orientation of the image data read by the image input section 33 is not matched with the orientation of record paper selected by the operation display section 31. If a record paper tray in which record paper oriented into a desired direction are contained becomes empty, the image data, being read out from the image data storage section 36 and expanded by the encoding/decoding section 35, are delivered to the image data processing section 37 and undergo rotation processing. Thereafter, the image data are output from the image output section 34.

(2) Facsimile Function

When image data are transmitted to another facsimile machine, an original to be transmitted is read from the image input section 33, and the read image is compressed to code data by the encoding/decoding section 35. The thus compressed code data are temporarily stored in the image data storage section 36. The operation display section 31 carries out inputting of a telephone number of a receiving end and the designation of a transmission mode. The communication control section 40 establishes a connection to the telephone line 43 and carries out the determination of a call after having accessed a station on the receiving end. Information such as the class of the facsimile machine on the receiving end is obtained from the communication control section 40, and transmission data are read from the image data storage section 36. Resolution is converted by the image data processing section 37 so as to match with that of a recording section of the facsimile machine on the receiving end, as required. The image data are encoded again by the encoding/decoding section 35 in accordance with an encoding system corresponding to the determined transmission mode, and the encoded image data are delivered to the communication control section 40. The image data, i.e., the digital code data, are modulated by a modem, and the modulated data are transmitted to the facsimile machine on the receiving end. At the time of completion of the transmission, the communication control section 40 disconnects the connection to the telephone line 43.

When image data are received from another facsimile machine, the communication control section 40 receives code data modulated by a modem through the telephone line 43. The received code data are demodulated by a modem, and the demodulated data are then converted into digital code data and are temporarily stored in the image data storage section 36. The code data stored in the image data storage section 36 are expanded to image data by the encoding/decoding section 35, and the expanded data are then output from the image output section 34. At this time, resolution of the received image data is converted to match with the resolution of the image output section 34 by the image data processing section 37, as required. As already explained in the copy function, if record paper directed in the orientation of the received image data runs out, the image data will be output from the image output section 34 after having been subjected to rotation processing in the image data processing section 37.

(3) Print Function

Print data transmitted through the network line 42 are received by the network interface section 38. The coded print data are converted into bit map image data by the code data developing section 41. The bit map image data are compressed into code data by the encoding/decoding section 35, and the compressed data are temporarily stored into the image data storage section 36. The stored data are read from the image data storage section 36 in accordance with a print control instruction sent together with the code data. The thus read data are expanded to image data by the encoding/decoding section 35 and are output from the image output section 34. The bit map image data may be subjected to an edge smoothing treatment at the image data processing section 37, as required.

FIG. 8 is a block diagram showing the structure of the job volume measuring section 39.

The job volume measuring section 39 is made up of a counter 51 for counting the number of scans, a counter 52 for counting RTC/EOFB codes, a counter 53 for counting page breaks, a computation section 54, and a counter 55 for counting output operations.

As previously mentioned, a job volume in this embodiment is defined as the number of sheets of record paper on which image data are practically output in the image output section 34. There are an "N-up copy" mode for outputting several pages of originals onto one sheet of record paper by reducing the size of the originals, and a "double-sided copy" mode for recording image data on both sides of record paper. For this reason, image data for one page are not necessarily output to one sheet of record paper. Taking this point into account, the job volume can be defined as Equation (1).

(job volume) = (number of originals) ×     (1)

(number of outputs)/(number of originals per one recording sheet)

In Equation (1), data of the number of outputs and data of the number of originals can be known from output data set by the operation display section 31 and output control data delivered together with the print data. On the contrary, the way of obtaining data of the number of originals differs depending on each function.

It is possible to obtain the data of the number of originals relating to the copy function by counting the number of times a scanner in the image input section 33 scans an original to read in the image input section 33, by means of the counter 51. However, this is on the assumption that the scanner scans each original only once even when one set of originals are duplicated in a plurality of copies; the read image data are stored in the image data storage section 36; and the data stored in the image data storage section 36 are read and subjected to an output treatment in the image output section 34 for the second and following copies. If the number of originals is previously known, the number of the originals may be entered from the operation display section 31 using keys. The counter 51 for counting the number of scans is initialized for each copy function job.

It is possible to obtain the data of the number of the originals relating to the facsimile function by detecting an RTC code (a control reset symbol applied to a Go machine) representing the end of one page and an EOFB code (a facsimile lock end code applied to a G4machine), from among digital code data demodulated from facsimile data received by the communication control section 40, using the encoding/decoding section 35, and by counting the thus detected codes using the counter 52 for counting RTC/EOFB codes. The counter 52 for counting RTC/EOFB codes is initialized for each facsimile function (print output) job.

It is possible to obtain the data of the number of originals relating to the print function by detecting a predetermined page break from among print data, being described in PDL such as postscript and received by the network interface section 38, in the code data developing section 41, and by counting the thus detected page breaks using a page break counter 53. However, page breaks are not necessarily inserted into the print data described in PDL. In such a case, the code data developing section 41 develops the code data into bit map image data, and one page is recognized when the number of lines per one sheet of record paper are achieved. The page break counter 53 is initialized for each print function job.

The thus obtained data of the number of originals for each function are subjected to computation in the computation section 54 together with the output data from the operation display section 31 in accordance with the Equation (1).

The data of the volume of a job output-processed are defined as the sum of the number of sheets of record paper output processed and discharged to the post-treatment section M3 from the print section M6 of the image forming apparatus in this embodiment and the number of sheets of record paper which remain inside the print section M6 and are still undergoing output processing. It is possible to obtain the data by counting both numbers of sheets using a counter 55 for counting the number of output operations. The counter 55 is initialized every time a job to be output-processed is switched in the image output section.

The control of the priority order of each job in the control section 32 will now be described.

The control section 32 prepares a job management table as shown in FIGS. 9(*a*) and 9(*b*) in accordance with the job volume for each function obtained in the job volume measuring section 39.

In FIGS. 9(*a*) and 9(*b*), a receipt number shows the order in which output processing in the image output section 34 is requested after the volume of each job for each function has been determined. In an example shown in FIG. 9(*a*), a facsimile function having a job volume of 5 initially requested output processing, and a copy function job having a job volume of 30 then requested the same. Thereafter, a print function job having a job volume of 50 and a print function job having a job volume of 1000 requested output processing in that order. At this time, the magnitude of each function job is the same as the order of the output processing requests, and hence the output processing is carried out in this order in the image output section 34.

A fifth copy function job having a job volume of 10 newly requested output processing as shown in FIG. 9(*b*). However, the job volume of this job is smaller than the second copy function job having the job volume of 30, and hence the control section 32 respectively decrements the output processing priorities of the jobs having the receipt numbers from 2 through 4 by one. Thus, the job having a receipt number 5 is set to have the second output priority. Concurrently, the number of interrupts resulting from the interrupt caused by another job are updated for each job. In the case shown in FIG. 9(*b*), the job having the receipt numbers 2 to 4 are the object of interrupt, and therefore the number of interrupts for each job is set to one. The management of the number of interrupts is intended to prevent output processing of a job having a larger job volume from being executed so long as there arises a request for output processing of a job having a smaller job volume. When the number of interrupts of a job reaches a predetermined number (a value previously set by the image forming apparatus or a value set by the user via the operation display section 31), an output processing priority of that job is not changed even if a job causes a request of output from this time on.

Figure 10:
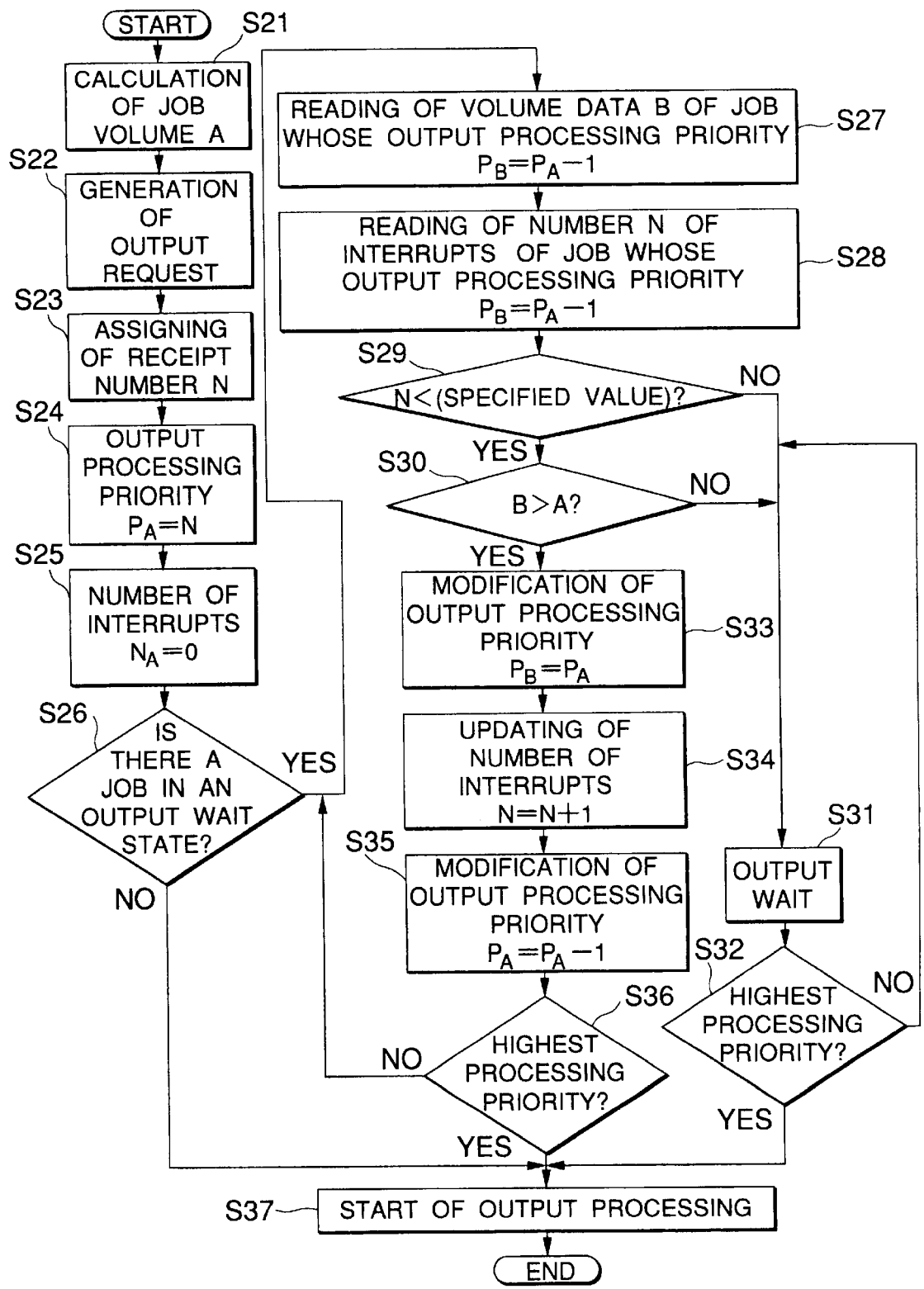
FIG. 10 is a flow chart showing a processing flow which illustrates a job processing priority modification operation in a control section.

FIG. 10 is a flow diagram for illustrating a processing flow of the modification of a job processing priority in the control section 32.

When a job of an arbitrary function relating to output processing of the image output section 33 arises, the volume of the job is calculated in accordance with the function in the job volume measuring section 39, and the obtained value is taken as A (step S21). After the volume of the job has been determined, output is requested (step S22), and a receipt number N for this job is obtained (step S23). Assume that an output processing priority $P_A$ is equal to the receipt number N when the output request occurs (step S24). The number of interrupts $N_A$ for this job is set to zero (step S25). Subsequently, upon reference to the job management table shown in FIGS. 9(*a*) and 9(*b*), whether or not there is a job in an output wait state is determined (step S26). If no job is in the output wait state, output processing will be started (step S37). Contrary to this, if there is a job in the output wait state, a job volume data B and the number of interrupts N of a job having the lowest output processing priority at this moment, i.e., a job which satisfies the equation of the output processing priority $P_B = P_A - 1$, are read from the job management table (steps S27 and S28). The number of interrupts N is compared with a predetermined specified value (step S29). If N reaches the specified value, it is impossible to assign a priority to another job preceding the job having the output wait priority $P_B$, and therefore the job enters an output wait state (step S31). The job in the output wait state is waited until the output processing of another job having a higher processing priority is completed (step S32). After the completion of the processing of the higher priority job, output processing is started (step S37). If N does not reach the specified value, the magnitudes of the job volume data A and the job volume data B are compared with each other (step S 30). If the job volume data A is larger than the job volume data B, an output processing priority $P_A$ will be determined, and the job will enter an output wait state (step S31). If the job volume data A is smaller than the job volume data B, the output processing priority will be changed. The job having the output processing priority $P_B$ is changed to have an output processing priority $P_A$, whereby the processing priority of the job is decreased by one (step S33). Since one job interrupt has occurred, the number of interrupts N is increased by one (step S34). Instead of this, the priority of the job having the output processing priority $P_A$ is increased by one (step S35). If the output processing priority is changed, whether or not the priority is the highest priority will be determined (step S36). If the priority is not the highest priority, processing will be carried out to determine whether or not the output priority is further changed. Here, whether or not an interrupt can be generated to a job having the second lower priority is determined (steps S27 and S28). Throughout the repetition of these operations, when the output processing priority reaches the highest priority, the output processing of the job is started (step S37). It is possible to include not only a job currently in the output wait state but also a job currently undergoing output processing as an object whose processing priority is to be changed. In the latter case, a job newly assigned the highest processing priority is processed in the form of an interrupt to the job currently undergoing the processing. If interrupt processing to the job currently undergoing processing is generated, it will be desirable for the job currently undergoing processing in the print section M6 to complete all of the predetermined output processing, so that the record paper is not left in the print section M6. Moreover, when interrupt processing is effected for the job currently undergoing the processing, it is desirable for the image processing apparatus to have the post-treatment section M3 capable of subjecting record paper, discharged from the image forming section M1 as shown in FIG. 7, to a post-treatment, that is, sorting. In this case, it is possible to prevent the job which had been undergoing processing before the interrupt from being mixed with the priority job which generated the interrupt by the use of a bin which is different from the sorter bin used for the job which had been undergoing output processing before the interrupt in such a way that record paper is discharged to the different bin as a result of the interrupt output processing. In this way, record paper output as a result of an interrupt becomes much easier to handle as a result of the use of a sorting machine for sorting record paper currently undergoing output processing from record paper of the interrupt priority job.

Differing from the prior art wherein an output processing priority order in the image output section 34 is determined depending on a copy function, a facsimile function, or a print function, the order of output processing of each job is impartially determined in accordance with the magnitude of the volume of the job irrespective of the function in the embodiment described referring to FIGS. 9 and 10. The magnitude of the volume of a job in each function has an offset. For example, where the volume of a job of the print function is constantly larger than the volume of jobs of the other functions, there is a high probability that jobs of the other functions which requested print processing will generate interrupts even when the job of the print function issues a request of print processing at an early stage. Hence, it is considered that the output processing of the print function job cannot be smoothly completed. In such a case, each function is previously given weighting as function data, and it is desirable to determine a processing priority taking into account this weighting value together with the volume of a job.

FIGS 11(*a*) and 11(*b*) is a chart for illustrating a method for determining an output processing priority order by taking function data into account.

FIG. 11(*a*) is a chart illustrating output processing priority control in accordance with the volume of a job when function data are not taken into account. A print function job having a job volume of 200 initially issued an output processing request, but all of the volume of five function jobs which arrived subsequent to the print function job are smaller than the volume of the print function job. For this reason, the five function jobs are processed before the print function job, and hence the number of interrupts of the print function job is five. In this example, the output processing of the first-arrived print function job will be executed at an early timing either when the output processing of a job which arrived later is finished or when the number of interrupts reaches a predetermined specified value. On the other hand, FIG. 11(*b*) is a chart illustrating an output processing priority order in accordance with the volume of a job when function data are taken into account. A weighting value α=1 is provided to a copy function and a facsimile function respectively, and a weighting value α=0.1 is provided to a print function. An output processing priority is determined by the use of a value which is obtained for each function job by multiplying a job volume J and a weighting value α. In this example, jobs which generated interrupts to the print function job having a receipt number 1 are suppressed to three function jobs having receipt numbers 2, 3, and 6. A value previously set by the apparatus or a value set by a user via the operation display section 1 is used as the weighting value. The volume of a job to be subjected to output processing which was received for each function is stored into the apparatus, and it is possible to obtain a weighting value from that stored value.

Figure 12:
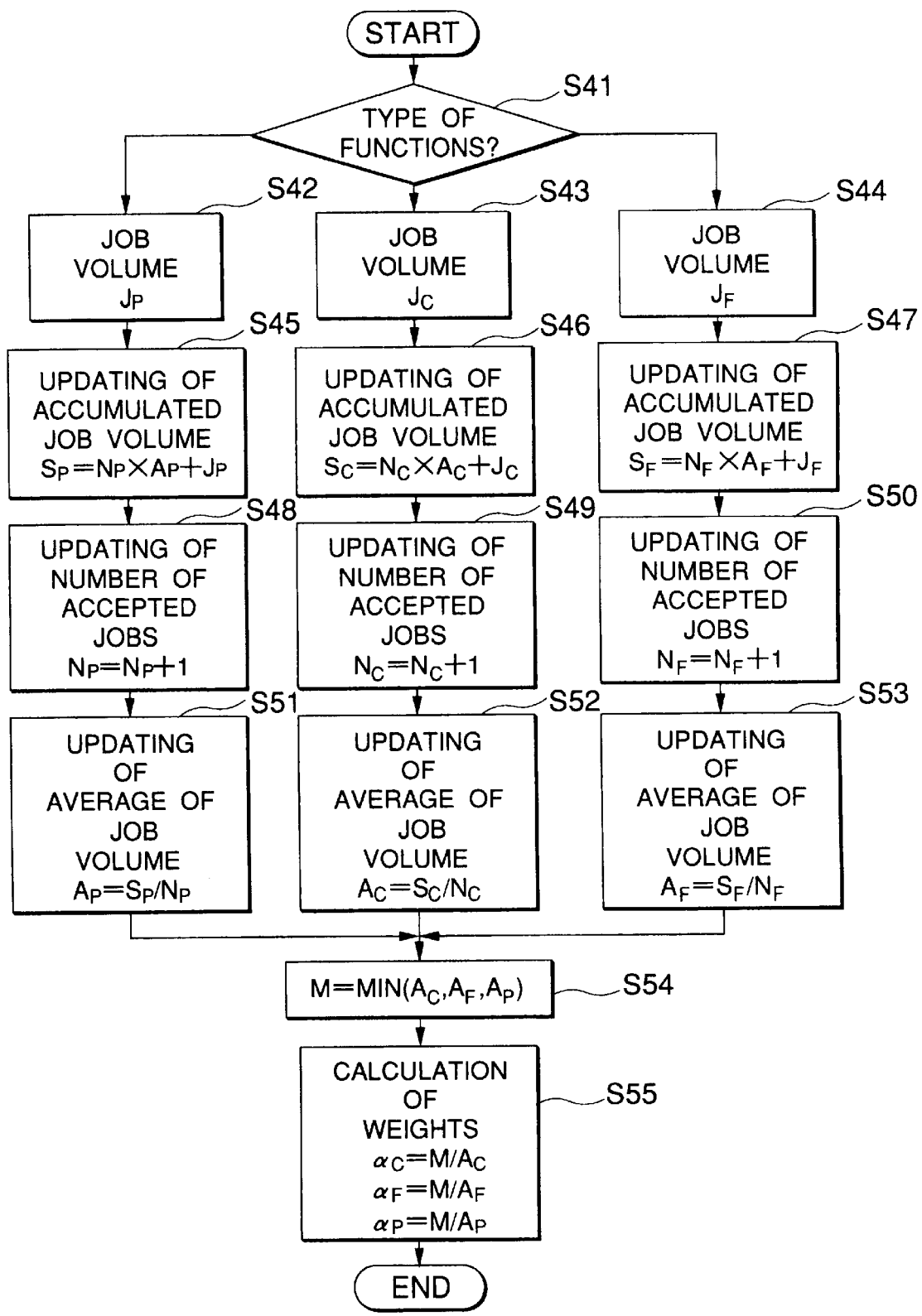
FIG. 12 is a flow chart showing a processing flow when a weighting value for each function is calculated from the history of operations of the apparatus occurring so far.

FIG. 12 is a flow diagram showing one example of a processing flow when a weighting value for each function is obtained from the history of operations of the apparatus so far by calculation.

The type of a function is determined to identify which function first issued an output processing request in the image output section 34 (step S41). In this example, a print function, a copy function, and a facsimile function are mentioned as examples of the type of function. These functions are respectively labeled with subscripts P, C, and F. Most recent job volume data $J_P$, $J_C$, and $J_F$ of the respective functions are updated in accordance with a result of determination (steps S42 to S44). The number of receipts $N_P$, $N_C$, $N_F$ of the respective functions are multiplied by job volume averages $A_P$, $A_C$, $A_F$, and the most recent job volume data $J_P$, $J_C$, $J_F$ are respectively added to the thus obtained multiplied values. As a result of this, job volume accumulated values $S_P$, $S_C$, $S_F$ of the respective function jobs are updated (steps S45 to S47), and the number of receipts $N_P$, $N_C$, $N_F$ of the respective functions are also updated (steps S48 to S50). Most recent job volume averages are obtained from the updated number of receipts NP, Nc, $N_F$ and the job volume accumulated values $S_P$, $S_C$, $S_F$ of the respective function jobs (steps S51 to S53). The minimum value MIN($A_P$, $A_C$, $A_F$) of the job volume average of each function is obtained (step S54). Weighting values $α_P$, $α_C$, $α_F$ are obtained by dividing the job volume averages of the respective function jobs (step S55). Specifically, according to the flow chart shown in FIG. 12, a rate of a job volume average per one function is obtained, and the thus obtained rate is used as a weighting value.

Figures 13, 14:
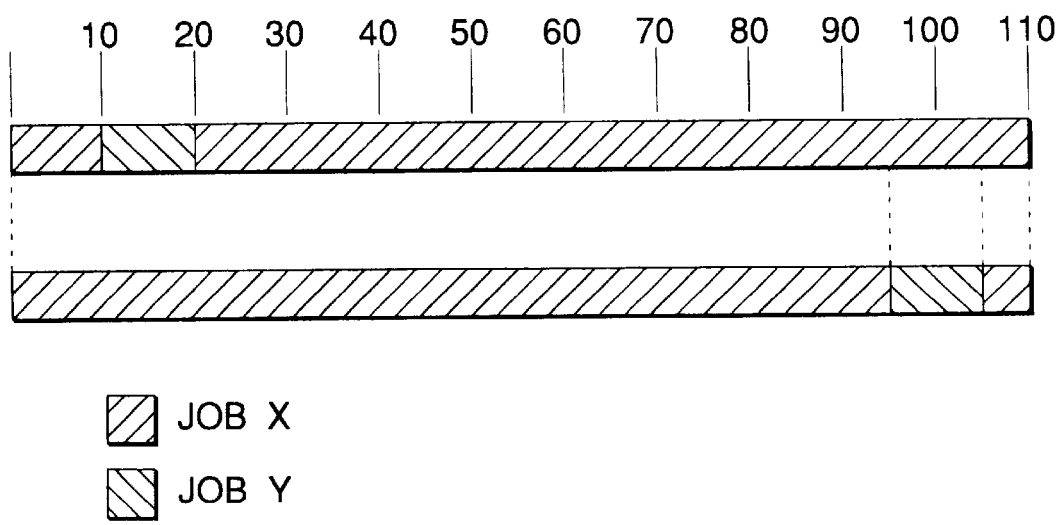
FIG. 13 is a chart illustrating an example of determination of a weighting value for each function in accordance with the volume of a job.
FIG. 14 is a schematic representation illustrating a degree of completion of a job when another job generated an interrupt to a job currently being processed.

As shown in FIG. 11(*b*), if only one weighting value is directly determined with respect to a function job, the print function job is necessarily processed earlier than the other function jobs when a request of output processing of a job having a volume of 10 occurs in the print function. As shown in FIG. 13, when a weighting value is determined in accordance with the type of function and the volume of a job, it becomes possible to preferentially process the volume of an output processing job in the range on which jobs are most concentrated for each function. In the example shown in FIG. 13, jobs are processed in the order of arrival without assigning priorities to the jobs depending on the function in the range where the volume of the jobs is relatively small (the volume of a job ranging from 1 to 19). However, in the range where the volume of jobs exceeds 20, a copy function job is set to be preferentially executed. In the range where the volume of jobs ranges from 50 to 59, a weighting value of the facsimile function is set to 0.02. This is applicable to, for example, the case where the number of facsimile transmittals of a sales financial statement to be sent to the head office at the end of a month is always in the range of 50 to 59, and this financial statement is printed immediately after it is received. With such a setting, it is possible to realize output processing with priority. In the range of more than 100 where print function jobs are concentrated, a setting is made so as to execute the print function jobs prior to the other jobs.

When an interrupt to a job currently undergoing output processing is generated by another job, it is desirable to take into account the volume of that job. For example, as shown in FIG. 14, there is no difference in the time when the output processing of a print function job X having a volume of 100 is completed whether an interrupt to the job X by another job Y having a volume of 10 is determined when the job X has already output 10 sheets or when the job X has already output 95 sheets. However, in the former case, an attainment factor of the job X is 10% when the interrupt is generated, whilst the rate of the completion of the job X is 95% (most of the job has already been completed when the interrupt is generated. In other words, in the case of output processing having a large amount of the job completed, there is a probability that other jobs will generate interrupts one after another even when the job is almost completed. Therefore, it is considered that the completion of the output processing will be delayed.

Figure 15:
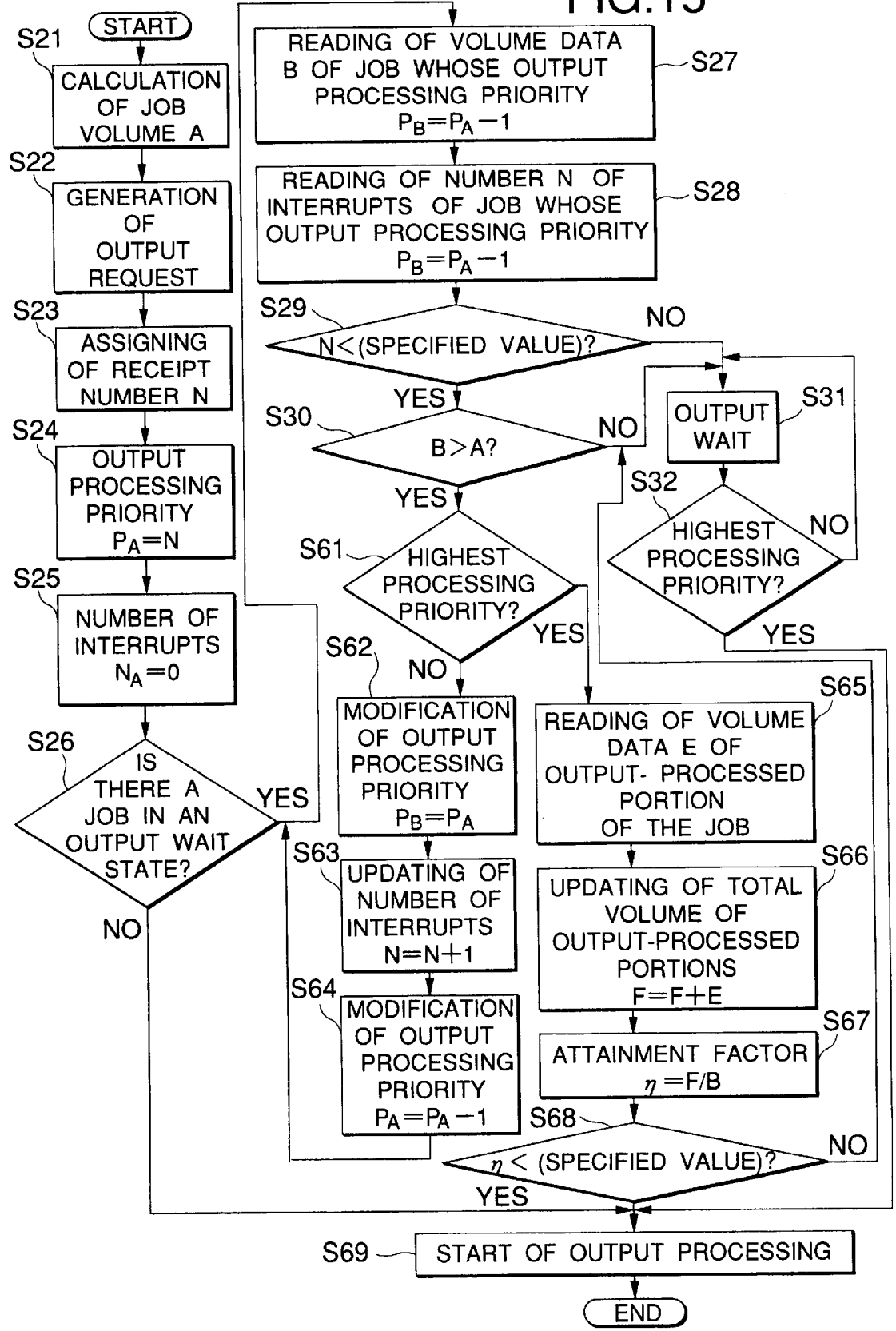
FIG. 15 is a flow chart showing a processing flow which illustrates a job processing priority modification operation of the control section when the volume of a job currently being subjected to output processing is taken into consideration.

FIG. 15 is a flow diagram illustrating a processing flow of the modification of a job processing priority of the control section 32 when the volume of a job currently undergoing output processing is taken into consideration. In the drawing, the steps S21 through S32 are the same as those in the processing flow shown in FIG. 10, and hence the explanation thereof will be omitted here for brevity.

In FIG. 15, the magnitudes of the job volume data A and the job volume data B are compared with each other in step S30. When the job volume data A is smaller than the job volume data B, whether or not the output processing priority $P_B$ is the highest priority is further determined (step S61). When the output processing priority $P_B$ is not the highest priority, the output processing priority of the job B which has had the output processing priority $P_B$ SO far is decreased to $P_A$ by one (step S62). Since one interrupt to the job B is generated by the job A, the number of interrupts N is increased by one (step S63). The priority of the job A which has had the output processing priority $P_A$ is increased by one (step S64). Processing is carried out to determine whether or not further modification of the output processing priority is executed. On the other hand, when the output processing priority $P_B$ is the highest priority in step S61, the job B is currently undergoing print processing. In this case, the data E of the volume of an output-processed portion of the job currently undergoing the output processing is read from the job volume measuring section 39 (step S65). The volume of processed job of the last time is added to the data E, so that a total volume F of output processing is obtained (step S66). The ratio of the total volume F of output processing to the job volume data B, i.e., F/B is calculated, so that the current ratio of completion η of this job is calculated (step S67). The ratio of completion is then compared with a predetermined specified value (step S68). A value previously set by the apparatus or a value set by the user from the operation display section 31 can be used as the specified value. If the completion ratio η of the job currently being subjected to output processing does not exceed the specified value, the output processing of the job A which has its output processing order been updated is started (step S69). If the completion ratio η of the job currently being subjected to processing exceeds the specified value, an interrupt is inhibited from being generated to the job currently undergoing output processing. The job A enters a wait state until the output processing of the job currently undergoing the processing is finished (step S31). After the output processing of the job currently undergoing the processing has been completed, and after the output processing priority $P_A$ of the job in the wait state has become the highest priority (step S32), the output processing of this job is started (step S69).

In the embodiment shown in FIG. 15, interrupt processing is carried out giving attention to the volume of processed job of the job currently being subjected to output processing. The volume of an unprocessed job is calculated in the control section 32, and it is possible to determine, whether or not an interrupt is generated, based on the volume of the unprocessed job. It is also possible to determine, whether or not an interrupt is preferentially generated, based on the volume of a job. With such a configuration, it is possible to determine the generation of an interrupt simply based on the number of outputs, for example, the number of outputs of less than 10.

In the embodiment shown in FIG. 15, whether or not an interrupt is generated with respect to the job currently being processed is determined by the completion ratio η. It is also possible to determine whether or not an interrupt is generated by comparing the volume (B-F) of a remaining portion of the job currently being processed, i.e., the volume of an unprocessed portion of the job, with the volume A of an interrupt job. For instance, it is also possible to make an arrangement in such a way that an interrupt will be permitted if the volume A of the interrupt job is smaller than the volume (B-F) of the unprocessed portions of the job. It is also possible to generate an interrupt only when the volume (B-F) of an unprocessed portion of a job is larger than the volume A of an interrupt job as well as the completion ratio η being smaller than a predetermined specified value. In other words, whether or not an interrupt is generated is determined based on three data, i.e., a completion ratio, the volume of an unprocessed portion of a job, and the volume of an interrupt job.

Figure 16:
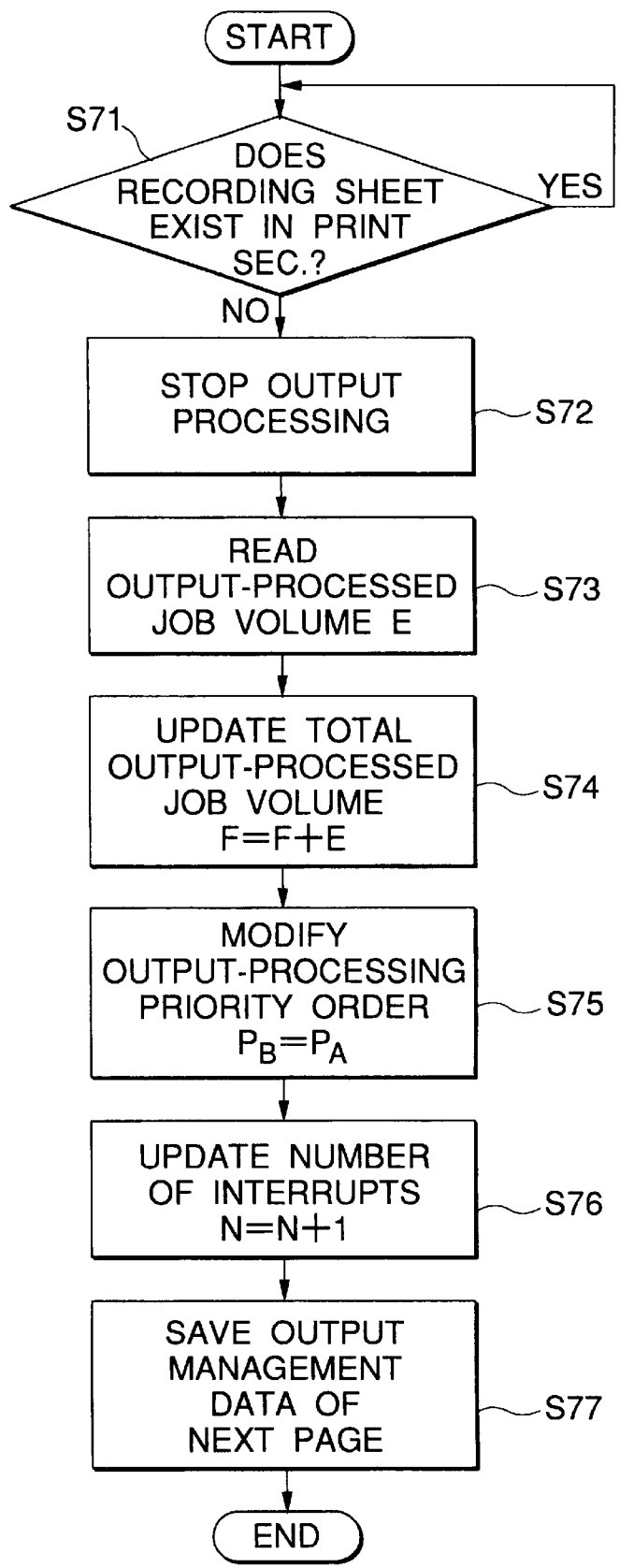
FIG. 16 is a flow chart showing a processing flow which illustrates control with respect to a job currently being processed when an interrupt is generated to that job.

Turning to a flow chart shown in FIG. 16, an explanation will be given of control of a job currently being processed in the control section 32.

When another job generates an output processing interrupt to a job currently being subjected to output processing, the complete discharge of record paper currently undergoing output processing within the print section M6 shown in FIG. 7 is first verified (step S71). The output processing of the job currently being processed is interrupted (step S72), and the volume E of an unprocessed portion of the current job is read out of the job volume measuring section 39 shown in FIG. 6 (step S73). The total volume F of output processing relating to the current job is updated (step S74). An output processing priority of the current job is decreased by one (step S75), and the number N of interrupts of the same is increased by one (step S76). Output management data necessary to resume the current job from the page where the processing was interrupted by the interrupt after the interrupt output job has been completed is saved (step S77).

As is evident from the foregoing descriptions, the order of processing is modified based on data relating to the volume of a job which also includes a job currently being processed. The processing of another job is preferentially carried out by generating an interrupt particularly to a job currently being processed. This interrupt processing differs from an ordinary interrupt operation and is executed without operator intervention. Moreover, the return of processing to the interrupted job from the interrupting job is also executed without operator intervention.

As described above, according to the invention, input image data is stored in job blocks, and the order of processing is determined by recognition of the volumes of the respective jobs. Therefore, it is possible to determine the processing priority order by the control section not necessarily based on the type of image data but simply based on the job volumes. It becomes unnecessary for an operator to perform laborious operations relating to the modification of the output processing priority order. It is also possible to reduce wait time to the minimum necessary level even when a job having a small number of outputs arises after a job having a large number of outputs.

Print data are received from a host computer or a host computer connected to a network, and sequentially printed in the order of processing which is determined on the basis of the volume of a received job. Hence, it becomes possible to start print processing of a small job without waiting for the completion of the print processing of a large job.

The volume of a job may be recognized in the form of an estimated processing time based on the storage data of stored image data. Hence it is possible to prevent a job which can be processed in a short period of time from being left over after a job which takes a long time. Moreover, a practical output processing priority order will be obtained without the operation of an operator.

New job volumes may be set and a new processing priority order may be determined when the current processing priority order is changed. It is possible to prevent a job having a large volume from constantly remaining unprocessed.

The processing priority order may be determined based on the data relating to the job volumes while taking into account function data relating to such functions as a copy function, a facsimile function, and a print function. Therefore, it is possible to prevent output processing of a job having a large volume for a specific function from being constantly delayed. Output processing of a specific function can be executed prior to output processing of another function, and therefore it becomes possible to execute processing suitable for distinctiveness of each function.

Even while output processing is being performed, an interrupt for processing a priority job may be generated. Hence, if the output processing of a job having a large volume is started, it will be possible to reduce wait time of a subsequent job having a small volume to the minimum required level.

An interrupt for a priority job may be determined in accordance with the volume of an output-processed portion or the volume of an unprocessed portion of a job being subjected to output processing. It is possible to prevent termination time of a job having a large volume whose output processing is nearly finished from being delayed as a result of interrupts occurring one after another. In addition, it is possible to prevent a priority job from being waited for a long time by a job having a large volume whose output processing will soon be started.

Recording sheets of an output-processed portion and those of a priority job for which an interrupt has been generated may be sorted from each other. It is possible to prevent the record sheet of the priority job and a record sheet of a job having underwent output processing so far from being mixed up.

A priority job for which an interrupt it to be generated may be selected based on the volume of the job. Hence it is possible for a job having a small amount to simply generate an interrupt.

Whether or not to generate an interrupt is determined by comparison between the volume of an interrupt job and the volume of an unprocessed portion of a job being subjected to output processing. An interrupt will be permitted when the volume of the interrupt job is smaller than the volume of the unprocessed portion of the job being processed, whereby a job having a small volume is prevented from waiting.

Whether or not to generate an interrupt may be determined based on the data relating to the volumes while taking into account function data relating such functions as a copy function, a facsimile function, and a print function. It is possible to prevent a job having a large volume of a specific function from being delayed constantly. Since output processing of a specific function can be executed prior to output processing of another function, processing can be performed so as to conform to specialties of each function.

What is claimed is:

1. An image forming apparatus comprising:
   image data input means for inputting image data;
   image data storage means for storing the input image data in units of a job that requires image formation;
   job volume recognition means for recognizing volumes of the respective jobs stored in the image data storage means; and
   processing priority determination means for determining a processing priority order of the jobs stored in the image data storage means based on the job volumes recognized by the job volume recognition means and for prohibiting a job from being skipped that has been skipped a predetermined number of times.

2. The image forming apparatus according to claim 1, wherein the image data input means has a plurality of interfaces for receiving print data from respective external devices.

3. The image forming apparatus according to claim 1, wherein the job volume recognition means recognizes the job volumes by estimating processing times of the respective jobs based on the image data stored in the image data storage means.

4. An image forming apparatus comprising:
   image data input means for inputting image data;
   image data storage means for storing the input image data in units of a job that requires image formation;
   job volume recognition means for recognizing volumes of the respective jobs stored in the image data storage means; and
   processing priority determination means for determining a processing priority order of the jobs stored in the image data storage means based on the job volumes recognized by the job volume recognition means,
   wherein the processing priority determination means sets new volumes for jobs whose processing priorities have been changed and determines the processing priority order based on the new job volumes.

5. The image forming apparatus according to claim 1, further comprising function data recognition means for recognizing function data of the respective jobs of the input image data, wherein the processing priority determination means determines the processing priority order further based on the function data.

6. The image forming apparatus according to claim 1, further comprising:
   output processing means for performing output processing in accordance with the processing priority order; and
   interrupt control means for generating an interrupt for a priority job to a job being subjected to the output processing by the output processing means.

7. An image forming apparatus comprising:
   image data input means for inputting image data;
   image data storage means for storing the input image data in units of a job that requires image formation;
   job volume recognition means for recognizing volumes of the respective jobs stored in the image data storage means;
   processing priority determination means for determining a processing priority order of the jobs stored in the image data storage means based on the job volumes recognized by the job volume recognition means;
   output processing means for performing output processing in accordance with the processing priority order;
   interrupt control means for generating an interrupt for a priority job to a job being subjected to the output processing by the output processing means; and
   job volume measuring means for measuring a volume of an output-processed portion of the job being subjected to the output processing, wherein the interrupt control means determines whether to generate the interrupt for the priority job based on the measured volume of the output-processed portion.

8. An image forming apparatus comprising:

image data input means for inputting image data;

image data storage means for storing the input image data in units of a job that requires image formation;

job volume recognition means for recognizing volumes of the respective jobs stored in the image data storage means;

processing priority determination means for determining a processing priority order of the jobs stored in the image data storage means based on the job volumes recognized by the job volume recognition means;

output processing means for performing output processing in accordance with the processing priority order;

interrupt control means for generating an interrupt for a priority job to a job being subjected to the output processing by the output processing means; and unprocessed job volume measuring means for measuring a volume of an unprocessed portion of the job being subjected to the output processing, wherein the interrupt control means determines whether to generate the interrupt of the priority job based on the measured volume of the unprocessed portion.

9. The image forming apparatus according to claim 6, further comprising a sorting device for sorting output recording sheets of the priority job for which the interrupt control means generated the interrupt from output recording sheets of the interrupted job.

10. The image forming apparatus according to claim 6, wherein the priority job for which the interrupt control means generates the interrupt is selected based on a volume of the priority job.

11. An image forming apparatus comprising:

image data input means for inputting image data;

image data storage means for storing the input image data in units of a job that requires image formation;

job volume recognition means for recognizing volumes of the respective jobs stored in the image data storage means;

processing priority determination means for determining a processing priority order of the jobs stored in the image data storage means based on the job volumes recognized by the job volume recognition means;

output processing means for performing output processing in accordance with the processing priority order;

interrupt control means for generating an interrupt for a priority job to a job being subjected to the output processing by the output processing means; and an unprocessed job volume measuring means for measuring a volume of an unprocessed portion of the job being subjected to the output processing, wherein the priority job for which the interrupt control means generates the interrupt is selected by comparing a volume of the priority job and the measured volume of the unprocessed portion of the job being subjected to the output processing.

12. The image forming apparatus according to claim 6, further comprising function data recognition means for recognizing function data of the jobs of the input image data, wherein the priority job for which the interrupt control means generates the interrupt is determined based on the function data of the jobs recognized by the function data recognition means.

13. The image forming apparatus according to claim 4, wherein the processing priority determination means includes means for prohibiting a job from being skipped if the new job volume is smaller than a predetermined value.

14. The image forming apparatus according to claim 4, wherein the job volumes are job volumes of priority-lowered jobs minus a job volume of a priority job, respectively.

* * * * *